United States Patent [19]

Vigerstrom

[11] 4,109,566
[45] Aug. 29, 1978

[54] FOOD CONTAINER HAVING ELECTRODE POCKETS

[75] Inventor: Knut Birger Vigerstrom, Stockholm, Sweden

[73] Assignee: Electro-Food AB, Sweden

[21] Appl. No.: 568,365

[22] Filed: Apr. 15, 1975

Related U.S. Application Data

[63] Continuation-in-part of Ser. No. 292,787, Sep. 27, 1972, Pat. No. 3,877,360.

[30] Foreign Application Priority Data

Sep. 29, 1971 [SE] Sweden .............................. 12342/71

[51] Int. Cl.$^2$ ............................................. A23L 1/01
[52] U.S. Cl. ........................................ 99/358; 99/359; 426/107; 426/113
[58] Field of Search ............. 99/358, 357, 359, 646 C, 99/646 R; 219/290, 289, 293, 288; 220/15; 229/7 R; 426/107, 109, 113, 124, 234, 244, 246

[56] References Cited

U.S. PATENT DOCUMENTS

| | | | |
|---|---|---|---|
| 1,098,338 | 5/1914 | Thompson | 219/293 |
| 1,101,730 | 6/1914 | Day | 99/359 |
| 2,364,537 | 12/1944 | Kerth | 99/359 |
| 3,365,092 | 1/1968 | Blessing | 220/15 |
| 3,543,673 | 12/1970 | McDevitt | 99/358 |
| 3,900,155 | 8/1975 | Rausing et al. | 229/7 R |

*Primary Examiner*—Richard E. Aegerter
*Assistant Examiner*—Willis Little
*Attorney, Agent, or Firm*—Cushman, Darby & Cushman

[57] ABSTRACT

A container for heating foodstuff contained therein comprising an electrically insulating outer wall forming an enclosure for the foodstuff, perforated inner electrically insulating wall means within the enclosure forming at least two pockets between said inner wall and said outer wall for receiving at least two spaced apart electrodes which are adapted to be connected to an electrical supply source, and removable closure means cooperating with said outer wall immediately adjacent said pockets whereby removal of said closure means opens said pockets for receiving the electrodes.

14 Claims, 11 Drawing Figures

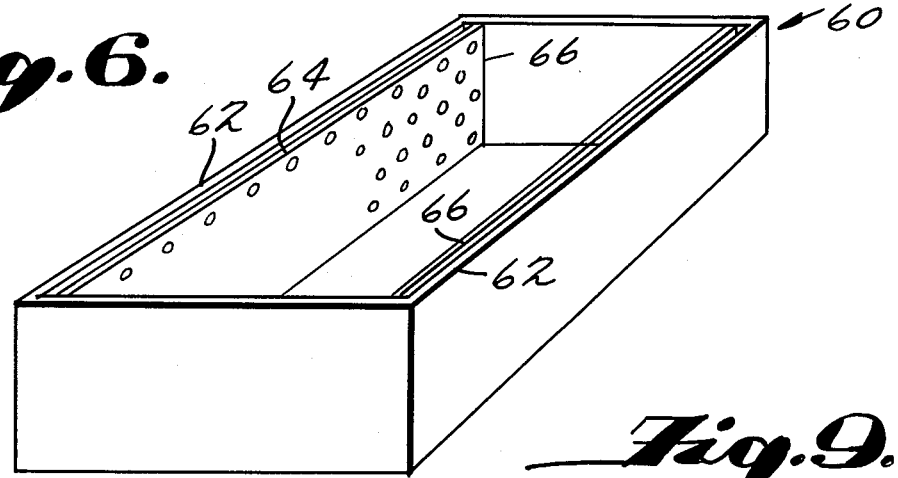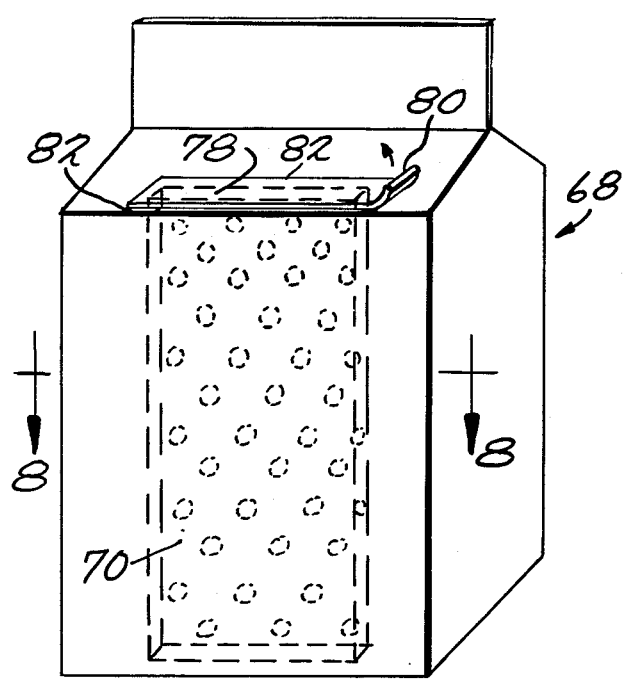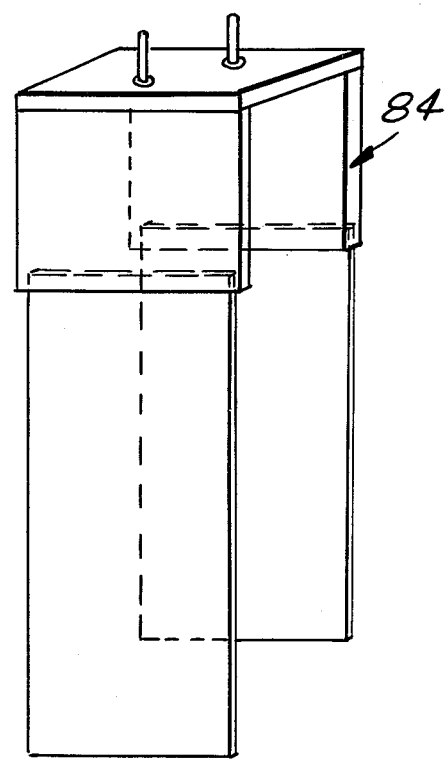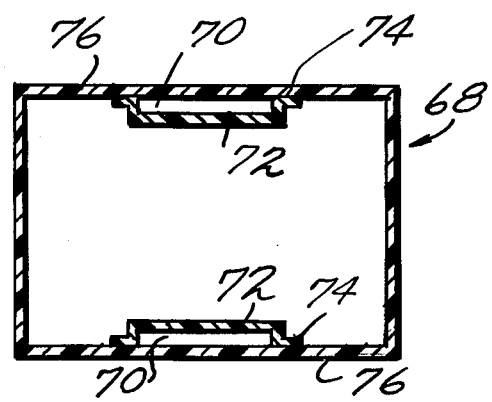

FOOD CONTAINER HAVING ELECTRODE POCKETS

This is a continuation-in-part of application Ser. No. 292,787, filed September 27, 1972, now U.S. Pat. No. 3,877,360.

The invention concerns a container, especially for food, for permitting treatment by passing electric current through the contents by establishing electric current paths between two electrodes in contact with a liquid enclosed in the container.

It is a purpose of the invention to form such a container which may be a tin can, a sealed carton, a plastic bag or box or other enclosure, so that the packed product is not damaged when the electrodes for the electric current treatment are inserted but also so that the electrodes can be placed in the location most advantageous from the electrical point of view. According to the invention this is attained by the fact that the container comprises at least one channel which can be opened towards the outside of the container so as to permit the insertion of a first one of said electrodes into the channel. The channel may have openings through which its inside communicates with the space containing the product and/or be removable after the insertion of the electrode so as to permit contact between the electrode and the liquid.

The container according to the invention should preferably not, or only slightly, differ from conventional containers and preferably present the same outer dimensions as these so that existing packing machines and distribution means can be used. According to the invention this is obtained with a container in which the channel is formed as a separate insert in the container.

A container according to this embodiment can be provided with an insert made of electrically insulating material and comprising a tubular portion arranged for central location in the container and for receiving said first electrode. A bottom plate may be connected with the central tube and have essentially the same dimensions as the bottom of the container, for example a tin can. The insert may also comprise a sleeve portion conforming with the outer wall of the container. If the insert comprises a bottom plate and central and/or peripheral tube member, the insert forms a basket by which the contents of the can is removable.

Embodiments of the invention will be described in the following with reference to the accompanying drawings, in which:

FIG. 6 is a perspective view of a flat carton;

FIG. 7 is a perspective view of an upright carton;

FIG. 8 is a sectional view taken on the line 8—8 of FIG. 7;

FIG. 9 is a perspective view of an electrode assembly for use with the carton of FIGS. 7 and 8;

Figure 1:
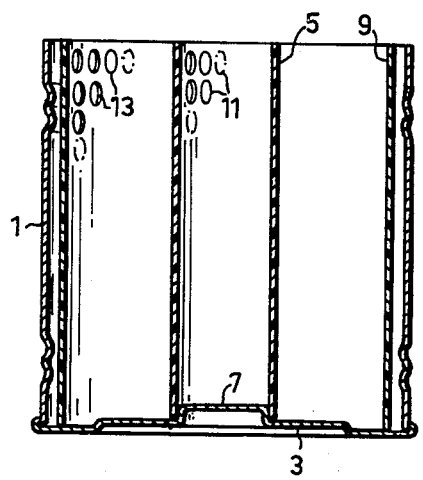
FIG. 1 is an axial sectional view through a cylindrical can embodying the principles of the present invention.

FIG. 1 shows a can with a side wall 1 of sheet metal and a profiled bottom 3 of electrically insulating material. A central inner insert tube or channel 5 of insulating material is placed into the can with its lower end engaging a raised portion 7 of the can bottom 3. Another outer insert tube or sleeve 9 of a diameter only slightly smaller than the inner diameter of the side wall of the can and made of electrically insulating material rests with its lower edge on the can bottom 3. The inner tube 5 as well as the outer sleeve or channel 9 have a large number of openings or perforations 11 and 13, respectively.

A product packed in the can shown in FIG. 1 can be treated by passing electric current therethrough by connecting the outer metal wall 1 of the can to one pole of a source of electric voltage and by connecting the other pole of said voltage source to an electrode which is inserted into the inner tube 5. The metal wall of the can thus forms one electrode.

The active surfaces of both electrodes should have about the same size during the current treatment. The active surface of the central electrode should therefore be as large as possible, and for this reason it might be desirable to remove the inner tube 5 from the container when the electrode has been inserted. The tube 5 has then fullfilled its task consisting in permitting the electrode to be inserted without damaging the product packed.

In conventional tin cans the inside of the side wall of the can is usually protected by a coating of lacquer. If such coated sheet metal is used as an electrode, the contents of the container might be discoloured and in the case of foodstuffs change in taste. In order to avoid this, the current treatment of the packed product can be effected with the help of two separate electrodes inserted into the can. An example hereof is illustrated in FIG. 2.

Figure 2:
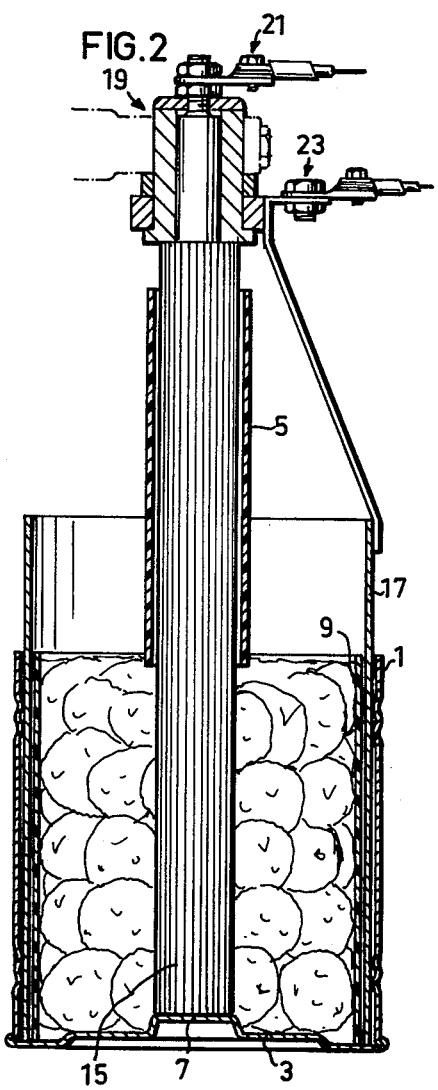
FIG. 2 is a view similar to FIG. 1 showing the can provided with a device for passing an electric current through the contents of the can.

According to FIG. 2 the can shown in FIG. 1 is used which comprises a sheet metal side wall 1, an electrically insulating bottom 3 and inner and outer electrically insulating insert tubes 5 and 9. A current supply electrode 15 is inserted into the inner tube 5 so as to rest with its lower end on the raised portion 7 of the bottom 3. The protection tube 5 is thereafter withdrawn upwards to the position indicated in FIG. 2. Simultaneously with the insertion of the electrode 15, an outer cylindrical electrode 17 is inserted between the outer insulating tube 9 and the can wall 1. The central electrode can be of carbon, the cylindrical electrode 17 of stainless steel. The electrodes 15 and 17 are sustained by a support 19 and are connected to terminals 21 and 23.

In the embodiment of FIGS. 1 and 2 the insulating can insert can also comprise a bottom united to the outer tubular insert 9 so as to form a basket by means of which the contents of the can can be lifted out.

Figure 3:
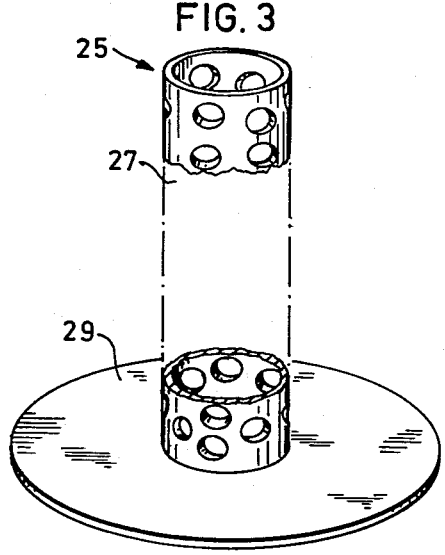
FIG. 3 is a perspective view of an insert for a cylindrical can.

FIG. 3 is a perspective view of an insert 25 of insulating material for a can, which can may be entirely of sheet metal. The insert 25 comprises a central, perforated tube 27 of essentially the same height as the can and a bottom sheet 29 of essentially the same dimensions as the can bottom. This insert 25 is inserted into the can before the product is packed into it. When the contents of the can are to be treated by passing electric current therethrough, a central electrode is inserted into the tube 27. The other electrode can be formed by the side wall of the can or by a separate cylindrical electrode placed inside the can wall. The bottom sheet 29 prevents creeping currents to pass between the central and the peripheral electrodes.

FIGS. 4, 6, 7, 8, 10 and 11 illustrate embodiments of containers made of electrically insulating material and having internal pockets into which electrodes may be inserted without interfering with the contents of the containers. The containers are made of electrically insulating material such as synthetic plastic, fibrous material, paper or cardboard and fibrous material impregnated or coated with plastic. In each case the pockets are opened by removing a removable closure just prior to consumption of the contents to allow for insertion into the pockets of electrodes which are part of a separate assembly. Three electrodes may be used with 3-phase current, and three or more electrodes may be used for creating desired potential fields in large or complicated containers. The electrode pockets are sealed when the container is sealed after being filled with the food product, and the pockets remain sealed during storage and transportation of the container until just prior to consumption of the food product.

Figure 4:
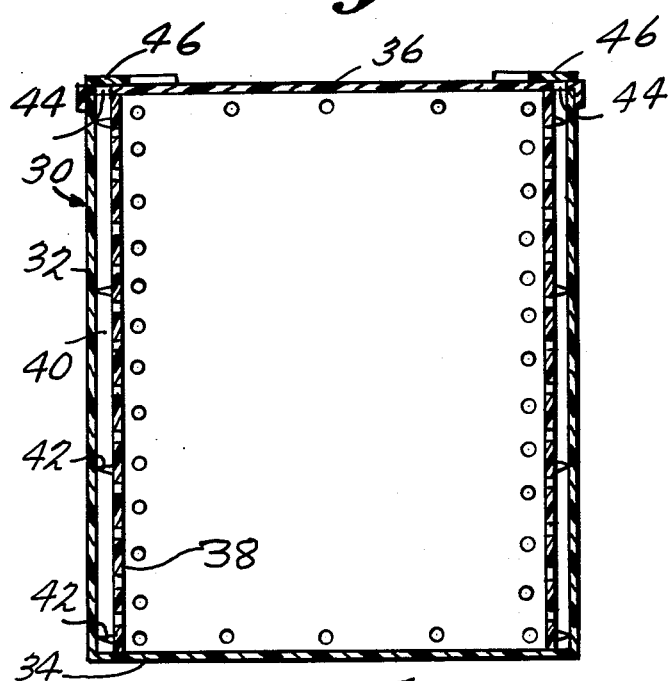
FIG. 4 is an axial sectional view of another cylindrical container.
Figure 5:
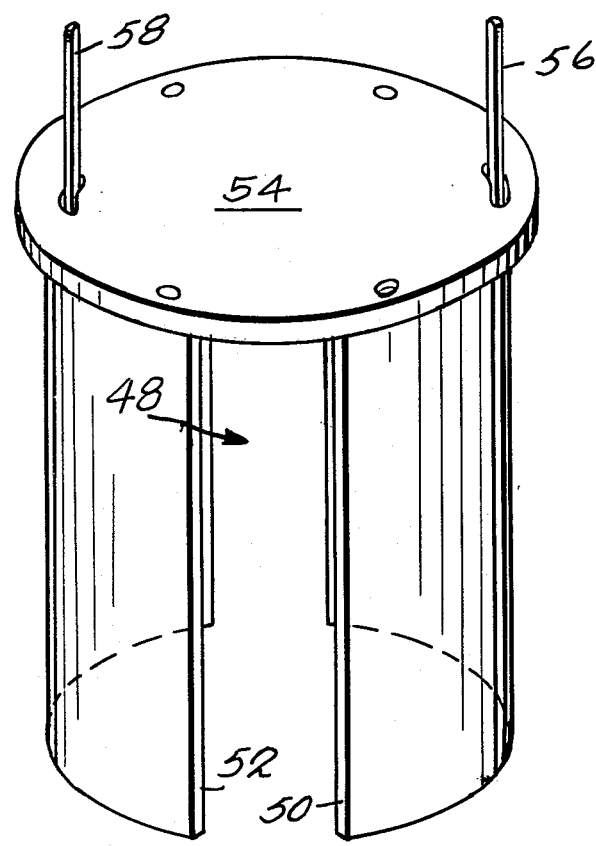
FIG. 5 is a perspective view of an electrode assembly for use with the container of FIG. 4.

In FIGS. 4 and 5 there is shown a cardboard or plastic container 30 having a cylindrical side wall 32, a bottom wall 34 and a top wall or cover 36 sealed to the upper end of the side wall 32. An internal tubular plastic sleeve 38 is spaced from the side wall 32 so as to form an annular space 40. The outer surface of the sleeve 38 is provided with radially projecting spacer elements 42 which are engageable with the side wall 32. These elements 42 may be deformable in a direction parallel to the axis of the container so as to be deformed when an electrode is inserted downwardly into the space 40. Alternatively the spacer elements 42 may be spaced apart a distance sufficient to permit entry of an electrode between adjacent elements 42.

The cover 36 is provided with two arcuate apertures 44 which are in communication with the annular space 40. Each aperture 44 is closed with a removable closure means in the form of a flexible tape 46 attached to the upper surface of the cover 36. When it is desired to heat the contents (not shown) contained within the sleeve 38 the tapes 46 are stripped off and an electrode assembly 48 such as that shown in FIG. 5 is inserted through the apertures 44 into the space 40. The electrode assembly 48 includes two electrodes 50, 52 mounted at their upper ends to a plate of electrically insulating material. Metal prongs 56, 58 project upwardly from the plate for connection to an electrical supply source. The electrodes 50, 52 are arcuate in transverse cross section so as to be insertable through the apertures 44 in the cover 36 and are approximately as long as the axial dimension of the space 40. There may of course be more than two electrodes in which case the cover will be provided with the appropriate number of apertures.

Alternatively the electrode assembly may comprise two electrode rings one coaxially above the other, the diameter of the rings being such as to permit their entry into the annular space. In this embodiment the entire cover 36 is removed to allow insertion of the electrodes into the space 40.

In the embodiments described above with respect to FIG. 4 it will be understood that the electrode pockets are formed by the annular space 40 and that the pockets are continuous with each other regardless of whether they are disposed on opposite sides of the axis of the container or one above the other.

In FIG. 6 there is shown a flat container 60 of rectangular shape constructed of electrically insulating material. In this embodiment an electrode pocket 62 is formed between each long side wall 64 and an internal perforated plastic wall 66. A cover or lid (not shown) has slots coinciding with the upper ends of the pockets 62, the slots being closed by removable closure means.

FIGS. 7 and 8 illustrate an upright self-supporting carton 68 constructed of electrically insulating material having electrode pockets 70 formed by an internal perforated wall 72 heat-sealed or otherwise attached at its edges 74 to the inner surface of the side wall 76 of the carton 68. The upper ends of the pockets 70 are sealed by removable closure means such as the external flexible tape shown in FIG. 4 or, as shown in FIG. 7, a removable strip 78 of the carton material. The strip 78 includes a tab 80 which may be lifted by grasping with the fingers and pulling upwardly so as to tear the carton along two perforation lines 82. The perforations do not penetrate through the wall of the carton but they weaken the wall sufficiently to permit tearing out of the strip 78.

FIG. 9 illustrates an electrode assembly 84 for use with the carton of FIGS. 7 and 8. A similar assembly, modified as necessary, may be used with the flat carton of FIG. 6.

Figure 10:
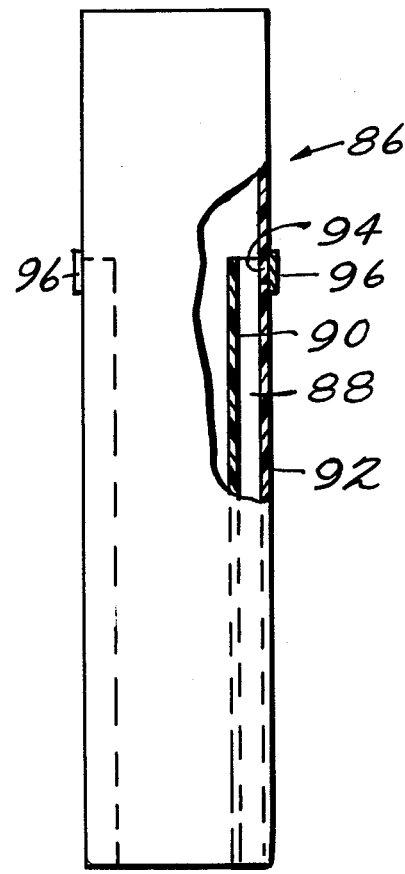
FIG. 10 is a side view of a bag.
Figure 11:
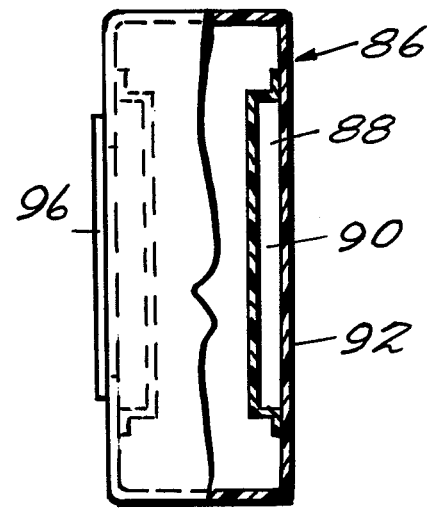
FIG. 11 is a plan view, partly broken away, of the bag of FIG. 10.

FIGS. 10 and 11 illustrate a thin-walled flexible plastic bag 86 having internal electrode pockets 88 formed from a perforated flexible plastic sheet 90 attached at its edges to the inner surface of a side wall 92 of the bag. An aperture 94 is provided in the side wall 92 at the location of the upper end of each pocket 88. The apertures 94 are sealed with strips 96 of tape removably attached to the outer surfaces of the side walls 92. The side walls 92 are sufficiently flexible to permit insertion of the electrodes of an electrode assembly like that shown in FIG. 9, after the strips 96 have been removed.

In the embodiments of FIGS. 7–11 the walls of the pockets 70 or 88 may be sufficiently flexible that they do not leave a free passage for insertion of the electrode but they allow the electrodes during insertion to merely push aside food particles rather than shearing or cutting off food fragments therefrom. In all embodiments the walls of the pockets prevent direct contact between the electrode and food particles and thus eliminate burns which would otherwise occur at the contact points.

The embodiment of FIGS. 4 and 5 may for instance be used by restaurant kitchens where small or large containers of potatoes, sausages and other bulk food is cooked. The embodiments of FIGS. 6–11 are suitable for packaging individual meals in for example cafeterias, snack bars, hospitals or aircraft. All the embodiments are suitable for home use.

What is claimed is:

1. A container for heating foodstuff contained therein comprising an electrically insulating outer wall forming a sealed enclosure for the foodstuff, perforated inner electrically insulating wall means within the enclosure forming at least two pockets between said inner wall means and said outer wall for receiving at least two spaced apart electrodes which are adapted to be connected to an electrical supply source, said outer wall having means defining apertures communicating with said pockets and removable closure means cooperating with said outer wall immediately adjacent said pockets for closing said apertures whereby removal of said removable closure means opens said pockets through said apertures for receiving the electrodes.

2. A container as in claim 1 wherein the removable closure means includes a flexible tape attached to the outer surface of the outer wall.

3. A container for heating foodstuff contained therein comprising: an electrically insulating tube-like outer wall forming an sealed enclosure for the foodstuff; an electrically insulating perforated tubular sleeve disposed within the enclosure coaxially with the outer wall so as to define an annular pocket for receiving at least two spaced apart electrodes which are adapted to be connected to an electrical supply source; and removable closure means closing the upper end of the annular pocket whereby removal of said closure means opens said pocket for receiving the electrodes.

4. A container as in claim 3 wherein said closure means comprises a removable top wall of the container.

5. A container as in claim 3 having a top wall, at least one aperture in said top wall in communication with the annular pocket, said closure means closing said aperture.

6. A container as in claim 3 wherein said sleeve includes a plurality of integral radially projecting elements which space said sleeve from said outer wall.

7. A container as in claim 6 wherein said radially projecting elements are deformable in a direction parallel to the axis of the sleeve so as to become deformed upon insertion of the electrodes.

8. A container as in claim 5 wherein the aperture in the top wall and the closure means therefor are arcuate in shape.

9. A container as in claim 5 wherein the removable closure means includes a flexible tape attached to the outer surface of said top wall.

10. A container for heating food contained therein comprising: an electrically insulating outer wall forming an sealed enclosure for the foodstuff; first and second perforated inner walls of electrically insulating material disposed on generally opposite sides of the enclosure and joined to the inner surface of the outer wall to form first and second pockets having open upper ends for receiving first and second electrodes which are adapted to be connected to an electrical supply source, said outer wall having an aperture communicating with the upper end of each pocket; and removable closure means for said apertures whereby removal of the closure means opens said pockets for receiving the electrodes.

11. A container as in claim 10 wherein said outer wall is a self-supporting wall constructed of fibrous material or synthetic plastic.

12. A container as in claim 10 wherein said outer wall is a flexible non-self-supporting bag.

13. A container as in claim 12 wherein said apertures in said outer wall face laterally outwardly.

14. A container as in claim 10 wherein said removable closure means includes a flexible tape attached to the outer surface of the outer wall.

* * * * *